United States Patent [19]

Cornwell

[11] Patent Number: 4,901,218

[45] Date of Patent: Feb. 13, 1990

[54] COMMUNICATIONS ADAPTOR FOR AUTOMATED FACTORY SYSTEM

[75] Inventor: Peter J. Cornwell, Wotton-Under-Edge, United Kingdom

[73] Assignee: Renishaw Controls Limited, Gloucestershire, United Kingdom

[21] Appl. No.: 164,291

[22] Filed: Mar. 4, 1988

[30] Foreign Application Priority Data

Aug. 12, 1987 [GB] United Kingdom ................. 8719107
Sep. 12, 1987 [JP] Japan ................................ 62-229446

[51] Int. Cl.$^4$ ....................... G06F 15/46; G05B 23/02
[52] U.S. Cl. ............................... 364/131; 340/825.07; 340/825.23; 364/138; 364/474.11; 364/474.37; 364/468
[58] Field of Search .................. 364/468, 131–135, 364/138, 139, 474.11, 474.37, 513, 200 MS File, 900 MS File, 551.02; 340/825.23, 825.06, 825.07

[56] References Cited

U.S. PATENT DOCUMENTS

| | | | |
|---|---|---|---|
| 4,071,911 | 1/1978 | Mazur | 364/138 X |
| 4,153,998 | 5/1979 | McMurtry | 33/556 |
| 4,281,379 | 7/1981 | Austin | 364/474.11 X |
| 4,382,215 | 5/1983 | Barlow et al. | 364/474.37 |
| 4,384,332 | 5/1983 | McMurtry | 364/474.37 |
| 4,428,055 | 1/1984 | Zurbrick et al. | 364/474.37 X |
| 4,459,655 | 7/1984 | Willemin | 364/474.11 X |
| 4,587,622 | 5/1986 | Herzog | 364/474.37 X |
| 4,611,296 | 9/1986 | Niedermayr | 364/513 |
| 4,628,478 | 12/1986 | Henderson, Jr. | 364/138 X |

OTHER PUBLICATIONS

"An Alternative Approach to MAP," The FMS Magazine, pp. 189–191, Oct. 1985.
"Users Handbook: Programs for Probes, Components Inspection and Tool Datuming with Fanuc 6TB Control," Renishaw Electrical Ltd., 1984.
Bundle of Leaflets by Xtal Corporation describing FACTORYnet and Other Products; date unknown.
Cornwell, "Servos Team Up with p.l.c.s. to Improve Automation," Electric Drives and Controls, Apr./May 1985.
"IBM Programmable Controller Support"; date unknown.
"Doubts Surface about where MAP is Leading," FinTech 4—Automated Factory, No. 33, pp. 1–2, May 30th, 1985.
"USA: Key MAP Building Block Will Lead to Early Product Offerings", FinTech 4—Automated Factory, No. 38, pp. 2–6, 1985.
Cornwell et al., "Modular Communications Tools for Computer Integrated Manufacture", pp. 387–392; date unknown.
"Developing a Low Cost, Modular Approach to Interfacing," The FMS Magazine, pp. 131–134, Jul. 1985.
"Texas Instruments Takes on a MAP Cost-Reduction Exercise," Automation, p. 5, May/Jun. 1985.
Fagan, "Texas Plots Automation Revolution", Electronics Weekly, Oct. 9th, 1985.
Bundle of Documents by Texas Instruments relating to its "TIWAY 1", and Unilink Products; date unknown.

*Primary Examiner*—Joseph Ruggiero
*Attorney, Agent, or Firm*—Spencer & Frank

[57] ABSTRACT

Factory machines such as CNC machine tools, co-ordinate measuring machines and industrial robots are connected in a local area network. Each machine controller is interfaced to the network via a communications adaptor which translates data, commands and programs between the Manufacturing Automation Protocol used by the network and the necessary machine-specific format. The communications adaptors are microprocessor-based and have additional input/output ports for controlling probes, other sensors such as temperature sensors and workpiece presence sensors, peripheral devices such as conveyors, and the "electronic handwheel" inputs of the machine controller. Controlling such devices from a program run in the communications adaptor rather than from the machine controller or from a computer on the network gives greater power, flexibility, convenience and potential for real-time control.

18 Claims, 3 Drawing Sheets

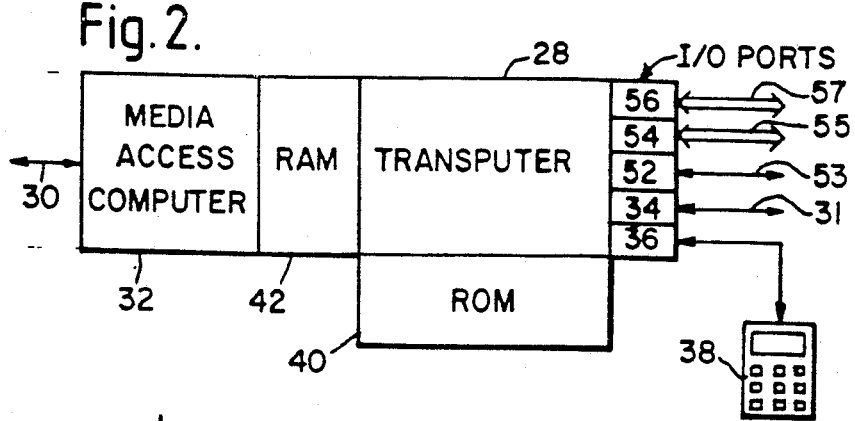
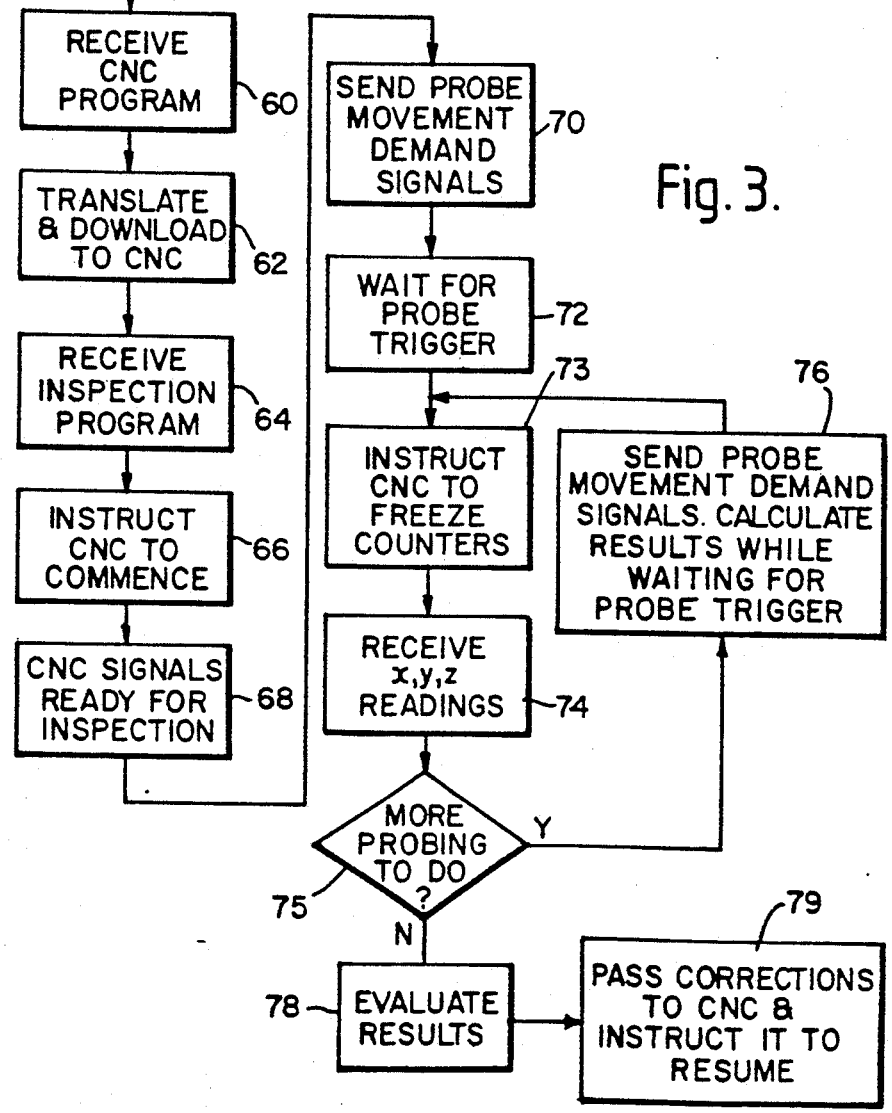

COMMUNICATIONS ADAPTOR FOR AUTOMATED FACTORY SYSTEM

FIELD OF THE INVENTION

This invention relates to the field of communications between machines in a factory, such as machine tools, co-ordinate measuring machines and industrial robots.

DESCRIPTION OF PRIOR ART

In the modern factory, various machines such as computer numerically controlled (CNC) machine tools, co-ordinate measuring machines (CMMs), industrial robots, etc are well known for the manufacture, assembly, inspection, handling and other processing of workpieces, manufactured parts or components. Each such machine is commonly provided with a controller, which is a computer for accepting commands or programs to cause the machine to perform a desired task such as machining or inspecting a workpiece. Different machines of different manufacture, with different controllers, require commands and programs in different languages and conforming to different communications protocols. This is a significant problem if, as is increasingly the case, one wishes to connect various machines together in a network, e.g. to form a computer integrated manufacturing or flexible machining system.

In recent years, recognising this problem, moves have been made to introduce internationally recognised standards for the connection and communication protocol used to communicate between the controllers of such machines. One such standard is the Manufacturing Automation Protocol (MAP), which defines communications protocols. The MAP includes the Manufacturing Message Service (MMS), which is a standard for the application protocol to be used for such communications.

To connect a machine controller of existing design into such a network requires a communications adaptor to interface the machine controller to the network and to translate commands and data from the standard language such as MMS to the individual language of the controller. The communications adaptor similarly translates data to be fed back from the machine to the network, for example the results of an inspection operation performed by a CMM, or status or alarm information from the machine or relating to the function of the machine. Such matters are discussed, for example, in an article entitled "An Alternative Approach to MAP", The FMS Magazine, October 1985, pages 189–191.

Devices may be interfaced to the network which do not have their own controllers. These include a wide variety of sensors which respond to the state or operation of a machine, such as temperature sensors and detectors for the presence or absence of a workpiece, and a wide variety of other peripheral devices such as conveyors. It is known to interface such devices to the network via programmable logic controllers (PLCs) which are available as off-the-shelf items. The PLC acts to transfer data to and from the network. It is then possible to achieve some form of real-time control of the peripheral device concerned, or real-time control of a machine using data fed back from a sensor, by means of a control program running in another computer on the network. It has also been suggested to interface machines which do have their own controller to the network via a PLC, which may also have other sensors or peripheral devices connected to it. Again, the PLC simply acts to transfer commands and data to and from the network.

However, real-time control relies on the speed with which the network can transfer control data to or from the device concerned. There is usually a response time overhead involved by operation of the network, which is often prohibitive for real time operation. Moreover, providing a programmable logic controller connection for each such sensor or other peripheral device is expensive.

It is also possible to interface such a sensor or peripheral device directly to the controller of an associated machine. Software in the machine controller then controls the sensor or other device. In addition to the examples mentioned above and many other possible sensors and peripheral devices, it is known to use workpiece inspection probes in this way on machine tools, CMMs and inspection robots. The probe is held by the machine and moved relative to the workpiece. The probe may have an analogue output and be used for scanning the surface contours of the workpiece. Alternatively, the probe may be a touch trigger probe of the type described in U.S. Pat. No. 4,153,998 (McMurtry), which generates a trigger signal upon contact with the workpiece. To facilitate so-called "in-cycle gauging" on a machine tool, for example, the machine controller holds a program which not only causes machining of a part, but also subsequently causes the machine to inspect the newly machined part with a touch trigger probe. This involves moving the probe until it touches the workpiece and generates a trigger signal, and then taking a reading from scales or resolvers of the machine which show the position of the probe in two or three dimensions. The process is repeated at different points on the surface of the part, in order to measure the desired dimensions to be inspected. The machine controller can then determine the size of a finishing cut to be performed on the part, based on the difference between the measured dimensions and the desired final dimensions as programmed into the controller.

However, present-day machine controllers are not specifically designed for controlling sensors or peripheral devices, or for such in-cycle gauging, and may lack the functionality and power to do so. Thus, if such operations can be successfully performed by the controller, they are performed relatively inefficiently. The result is that the operation takes a significant time, during which the machine is not performing machining operations. This has an appreciable effect upon the overall efficiency of the operation of the machine tool. Moreover, if a probe is interfaced directly to the machine controller, the controller may lack the functionality to "freeze" the scale or resolver readings immediately upon receipt of the probe signal. This leads to inaccurate measurement results where measurements are taken while the machine is moving the probe.

The software which is required in the controller to handle any such sensors or peripheral devices will be unique to the machine concerned and not generally compatible with other machines with different controllers. Both the software itself and any resulting data produced thereby will be in a unique data format which requires translation from or to the format used by the network, such as MMS.

SUMMARY OF THE INVENTION

The present invention resides in the provision of a communications adaptor between a factory machine and a communications network, having data processing means which not only translates data passing between the network and the machine, but also is able itself to control the machine or a peripheral device, or to interface a probe or other sensor. Software in the communications adaptor can therefore provide a controlling function independently of or in addition to the machine controller or the network, and with performance and functionality independent of the machine controller and the network, thereby reducing at least some of the problems and disadvantages discussed above.

BRIEF DESCRIPTION OF THE DRAWINGS

Preferred embodiments of the invention will now be described by way of example, with reference to the accompanying drawings, wherein:

FIG. 2 is a schematic diagram of a communications adaptor shown in FIG. 1, and FIGS. 3–5 are flow-charts explaining the operation of the communications adaptor.

DESCRIPTION OF PREFERRED EMBODIMENTS

Figure 1:
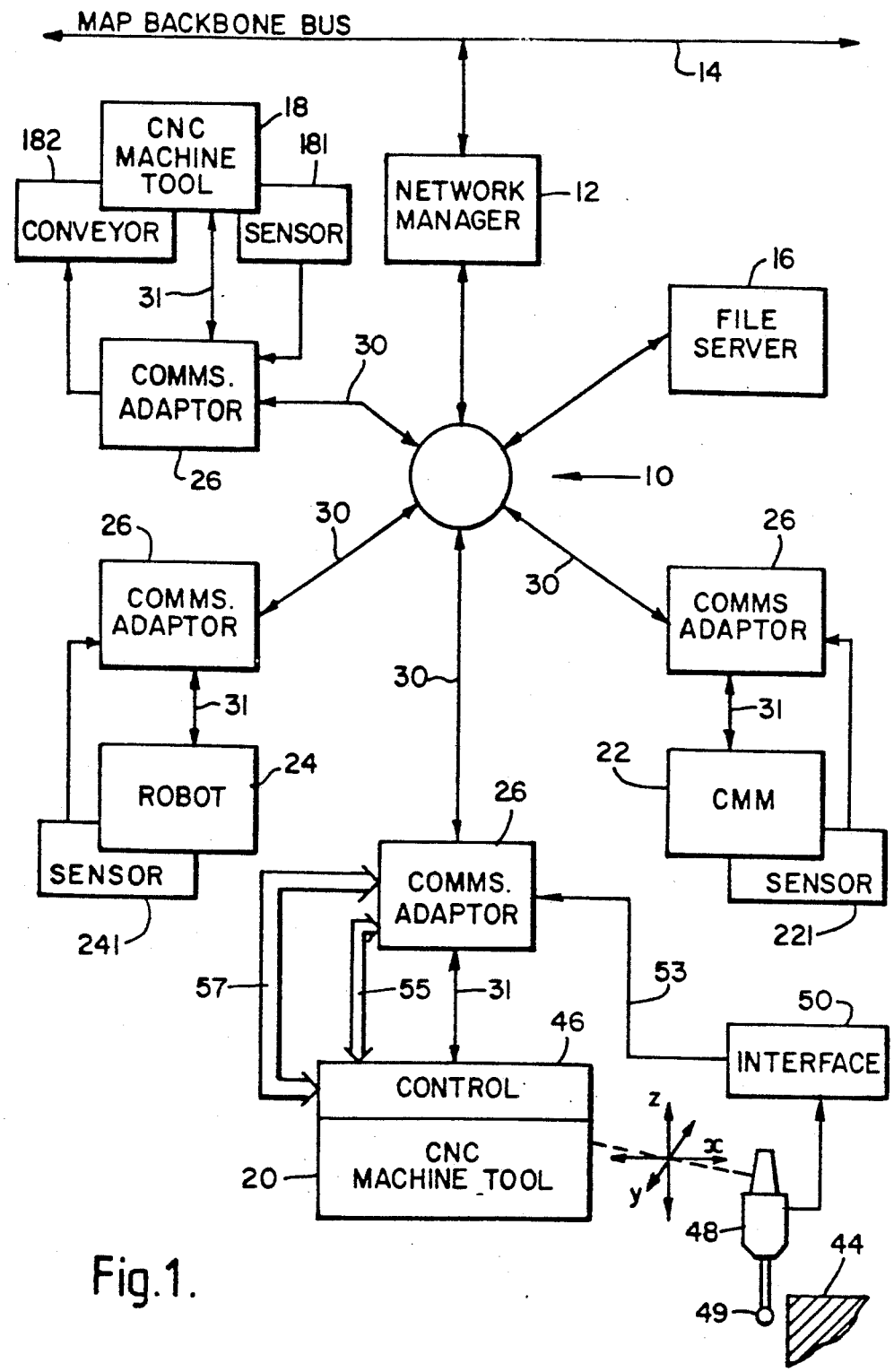
FIG. 1 is a schematic diagram of a communications network incorporating an embodiment of the invention.

The network 10 shown in FIG. 1 is a local area network intended for communications within a manufacturing cell in an automated factory. It comprises a token ring communications network conforming to the internationally recognised IEEE802.5 specification. Management of the network 10 is provided by a network management computer 12. The computer 12 may also serve as a gateway for the network to a MAP token bus backbone 14, which conforms to the internationally recognised IEEE802.4 specification, and which may be connected to mainframe computers, other similar local area networks, computer aided design systems, etc. The network management computer 12 for the local area network 10 may be based upon an IBM personal computer. The network 10 also has a file server computer 16, with appropriate disc storage facilities, also based upon an IBM personal computer. (IBM is a trademark, and it will be appreciated that other computers could well be used instead). The network 10 may use low cost twisted pair or fibre optics connections, and it may use MAP's Manufacturing Message Service (MMS) protocol to interface production control "application" programs with the various manufacturing equipment connected to the network.

Numerous different types of factory machine may be connected to the network 10. These include computer numerically controlled (CNC) machine tools 18,20, such as CNC lathes and CNC machining centres, for producing manufactured parts or components; co-ordinate measuring machines (CMMs) 22 for inspecting parts or components once manufactured; and industrial robots 24 for handling the parts or components and the billets of metal from which they are manufactured, e.g. for positioning them on the machines or transferring them between the machines, or for performing certain manufacturing operations themselves (such as the assembly of components or packaging). In general, each such machine will be provided with a controller by its vendor, which is in effect a special purpose computer working to protocols and programmable with commands in a language both of which may be unique to the vendor of that controller. In general the controller is not compatible with the controllers of other machines on the network.

Each of these machines is therefore provided with a communications adaptor 26 to interface it with the network 10. A suitable communications adaptor is available from Renishaw Controls Limited, Old Town, Wotton-under-Edge, Gloucestershire, England under the trademark RC4. Each communications adaptor 26 is interfaced to the network 10 via a serial communications link 30 conforming with the IEEE802.5 specification, and communicates with machines 18,20,22 and 24 via a communications link 31 appropriate for the machine controller (normally a serial link conforming to the RS232, RS422 or RS423 specifications).

FIG. 2 shows one of the communications adaptors 26 (namely the one connected to the machine tool 20) in more detail, by way of example. It is micro-processor based, and more specifically it is based upon a transputer 28, of type T212 sold by Inmos Limited, Bristol, England. The other adaptors 26 are of similar construction.

The transputer 28 shown in FIG. 2 has random access memory (RAM) 42 for data space, and a media access computer 32 which provides the IEEE802.5 input and output to the network 10 via the link 30. The media access computer 32 has direct memory access to the RAM 42. The transputer is also provided with a number of further input/output (I/O) ports 34,36,52,54,56. Some of these may be configured as serial ports, some as parallel ports and some as analogue ports. One serial port 34 is connected to the serial link 31 to the machine 20. A further serial port 36 is connected to a "pendant" 38, namely a user interface comprising a hand-held keypad and display, which can be used to input data manually to control the machine as will be described later. The transputer 28 is provided with a read-only memory (ROM) 40 in which is stored a program for translating the MAP standard commands and data from the network 10 into and from commands and data in a format specific to the particular machine to which the adaptor has been connected. The ROM 40 may be pluggable so that any of a number of plug-in replacement ROMs 40 may be inserted to suit the various machines 18,20,22 and 24. In this way, a standard design of communications adaptor 26 can be used and can easily be made specific to any machine.

In addition to the ports 34,36, the transputer 28 is provided with one or more ports 52,54,56 intended for controlling various means for performing operations associated with the connected machine, and/or for receiving signals from one or more probes or other sensors associated with the machine. This can be seen from FIG. 1 in conjunction with FIG. 2 where the communications adaptor 26 associated with the CNC machine tool 20 is provided with various I/O connections to the machine tool 20 in addition to the serial link 31.

The machine tool 20 is a generally conventional CNC machining centre, and therefore has x,y and z drives for moving a rotatable spindle in three dimensions relative to a workpiece 44 to be machined, and means such as scales or resolvers with counters for measuring and holding the relative displacement. The spindle may pick up any of a number of cutting tools stored in a magazine. The tools picked up and the path over which they move in order to machine the workpiece is controlled by a part program stored in a controller 46 of the machine. The serial link 31 is connected to the machine 20 via the controller 46. All this construction is very conventional and is therefore not shown in any detail. Of course, the machine tool 20 may have more or less than three axes of movement, and need not be a machining centre. For example, it could be a CNC lathe, with various tools held in a turret.

As is also well known, one of the tools which can be moved by the machine tool 20 relative to the workpiece 44 is a touch trigger probe 48, for example as described in U.S. Pat. No. 4,153,998 (McMurtry). Such a probe gives out a signal via a signal conditioning interface 50 when its stylus tip 49 touches the workpiece 44. Conventionally, such a probe is interfaced directly to the controller 46, and a part program stored in the controller includes a gauging cycle in which the machine tool picks up the probe 48 in its spindle and moves it around the workpiece, touching various points on the workpiece. Each time the trigger signal is detected by the controller 46, it freezes the counters of the machine's scales or resolvers and takes a reading from them showing the x,y,z co-ordinates representing the point of contact. Usually, it is necessary to correct each reading by subtracting "probe offsets" which compensate for factors such as the effective radius of the stylus tip 49, taking into account the triggering characteristics of the probe. Various desired dimensions of the workpiece 44 can then be determined from the readings taken.

In the present example of the invention, however, the probe 48 is not interfaced to the controller 46, but rather to an I/O port 52 of the transputer 28 in the communications adaptor, via line 53. A further parallel I/O port 54 of the transputer 28 is interfaced via parallel lines 55 to outputs of the machine controller 46 which indicate the instantaneous readings of the machine's scales or resolvers. Finally, a parallel set of lines 57 connects a parallel I/O port 56 of the transputer 28 to inputs of the controller 46 which are conventionally provided to permit external manual control of the x,y,z drives of the machine tool. These inputs are commonly known as "electronic handwheel" inputs. They may of course be analogue inputs instead of parallel digital inputs.

The machine tool 20 can now be operated in the manner illustrated in FIG. 3, which shows in broad outline the operation of its communications adaptor 26. At the start of the procedure, the network management computer 12 causes a CNC part program for the machine tool 20 to be downloaded from the file server 16 over the network 10 to the communications adaptor 26 of the machine 20. This is received by the communications adaptor in step 60, and of course the program is at this stage in the generic format of the MAP Manufacturing Message Service. In step 62, the transputer translates this part program into the necessary machine-specific format and downloads it to the machine tool over the link 31. Next, in the same way, an associated inspection program, complementary to the CNC part program, is downloaded from the file server 16 to the communications adaptor 26 (step 64).

The network management computer 12 will also be responsible for controlling other operations in the manufacturing cell, such as causing the robot 24 to place a billet of material to form the workpiece 44 on the machine tool 20. When all is ready, the network manager 12 issues a command through the network 10 to cause the machine tool 20 to commence machining the workpiece 44 in accordance with the part program. In step 66, this instruction is received by the communications adaptor 26 of the machine 20 which thereupon instructs the machine tool to proceed.

Whereas in a conventional system, the part program stored in the controller 46 of the machine tool would have included one or more inspection or gauging cycles, with the present system the part program in the controller 46 is simply suspended when the time is reached for an inspection cycle, the controller 46 having first caused the machine tool to pick up the probe 48 in its spindle. The controller 46 now signals to the communications adaptor 26 that it is ready for the inspection cycle by sending a message along the serial link 31 (step 68).

Upon receipt of the message, the communications adaptor starts to run the previously stored inspection program. This program will naturally depend upon the part 44 to be inspected, and will include conventional steps such as probe datuming to determine probe offsets for correcting subsequent readings. To cause x,y,z movement of the probe 48, the program causes the transputer to produce x,y,z demand signals on the parallel lines 57 to the electronic handwheel inputs of the controller 46. During inspection, this is used to cause x,y,z movement of the probe 48 to touch the workpiece 44 at a desired point (step 70). This movement continues until in step 72, the transputer 28 determines that it has received a trigger signal from the probe 48 on the input line 53. The transputer immediately latches in and reads the instantaneous outputs of the machine's scales or resolvers, showing the x,y,z co-ordinate reading, from the port 54. Probe movement is also stopped, to prevent collision damage. If the probe movement was at a high speed (to increase the overall speed of the inspection cycle) then the program may first reverse the probe out of contact with the workpiece, and then touch the point at a slower speed before taking the co-ordinate reading. This improves the accuracy of the reading. It will be appreciated that the communications adaptor can take the co-ordinate reading much faster than the controller 46, and can therefore do so more accurately. For example, the input 53 can generator an interrupt to the program in the adaptor, which the controller 46 might not be capable of doing.

If the inspection program contains more probing steps, the program loops back from step 75 to accomplish these. In step 76, it sends new probe movement demand signals on the lines 57 to cause the probe to touch the workpiece at a new point. Concurrently with this, the transputer corrects the reading just taken by subtracting previously determined probe offsets, and calculates a dimension of the workpiece if sufficient readings have been taken. This is all done while waiting for the probe trigger signal for the new point on line 53, and is therefore more efficiently performed than could be achieved by the controller 46. On receipt of this trigger signal, steps 73, 74 and 75 are repeated.

If, in step 75, the end of the inspection cycle has been reached, the program proceeds to step 78. Here, the transputer 28 corrects the most recent reading, calculates the remaining dimensions of the part 44, and evaluates the differences between the dimensions as measured and the desired final dimensions. It converts these measured values into tool correction offsets which it transmits down the serial link 31 to the controller 46, and then sends a message down the serial link to cause the machine tool to resume machining operations (step 79).

These machining operations will of course now take account of the tool correction offsets so that the workpiece 44 is finally machined to the desired dimensions.

The result of this technique is that the part 44 is machined to the required dimensions by a process of in-cycle gauging. However, compared with conventional techniques where the in-cycle gauging is carried out entirely by the part program stored in the controller 46, it will be seen that the gauging steps are in fact carried out by the transputer 28 in the communications adaptor 26. One advantage is that the gauging process can be carried out much faster than previously since conventional controllers 46 are not specifically designed or suited for such gauging operations, and the transputer can carry out the necessary calculations more efficiently. Moreover, this is achieved without a great deal of extra expense (such as would be entailed in providing a more powerful controller) since computing power is available already in the communications adaptor 26 in the case where a machine tool is to be connected to a network. Part of the increase in speed results from the fact that the controller 46 and the communications adaptor 26 can run in parallel: the transputer 28 can be calculating probing results while the controller 46 is moving the probe to the next measurement position demanded by the signal on the lines 57. As brought out above, the results can also be more accurate.

If desired, the communications adaptor can also run the part program for machining the workpiece, in addition to or instead of the inspection program. This is a form of direct numerical control in which the controller 46 is simply obeying instructions from the communications adaptor, and does not itself follow a separate numerical control program.

Figure 4:
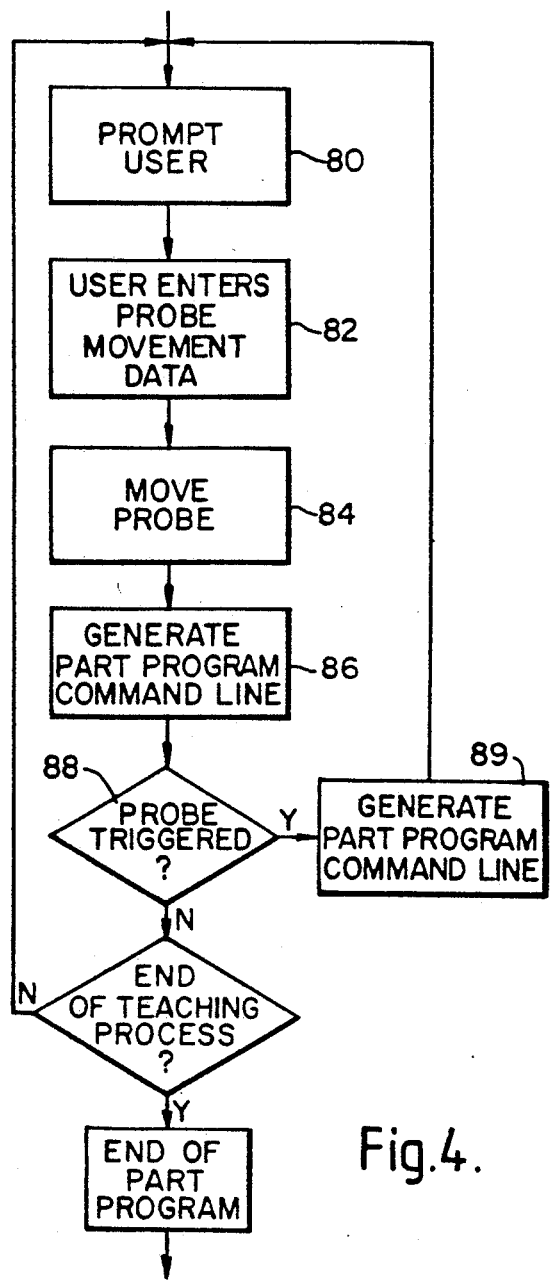

In the example described above, the inspection program was simply downloaded from the file server 16 to the communications adaptor 26. However, if desired, when a new type of component is to be machined and inspected on the machine tool 20, the machine operator can use the pendant 38 to teach the communications adaptor the necessary probe paths for the inspection operation. A "self-teaching" program (illustrated in FIG. 4) is downloaded from the file server 16 to the communications adaptor 26. This prompts the user, over the hand-held pendant, to enter information to control the movement of the probe (step 80). As he does so (step 82), the transputer outputs signals on the lines 57 to cause the probe to mimic those movements (step 84). This enables the user to see precisely what results his instructions are having. As the user makes various probe movements in this manner, the communications adaptor 26 automatically generates corresponding probe movement command lines of a part program (step 86). When the user causes the probe 48 to touch the workpiece 44, the communications adaptor 26 notes the incoming signal on the line 53 (step 88) and generates a command in the part program for the inspection operation to note that a measurement is required at this point (step 89). At the end of the teaching process, the part program thus generated can be run immediately on the transputer 28, or it can be uploaded to the file server 16 and stored for future use on similar parts 44.

The advantage of this procedure is that the movement of the probe 48 can be effected in real time from the pendant, which would not be possible or which would be more difficult to arrange if the user were entering data into one or more of the computers of the network 10, because of the lack of speed of such a network. This means that the part program can be generated without any skill on the part of the operator since he can simply see where he is is moving the probe. The pendant 38 could not normally be interfaced directly to the controller 46 since the controller 46 of a given machine is probably not capable of receiving such inputs, or would not be powerful enough to run a self-teaching program. As previously, the computing power for the real time generation of the part program is achieved at little extra cost since the transputer is provided already for communication with the network. Moreover, the self-teaching program, and the part program which it generates, can be in the generic MMS format, without translation.

The above examples have related to the use of a touch trigger probe 48 on a machine tool, and have controlled the operation of the machine tool via the lines 57, overriding any program in the controller 46 which is suspended for this purpose. However, the same principle of using the I/O ports of the communications adaptor 26 can be applied to other machines.

For example, a sensor 221 can be provided on the co-ordinate measuring machine (CMM) 22, interfaced to one of the I/O ports of the corresponding communications adaptor 26. The sensor 221 may be a touch trigger probe, used in a similar manner to the probe 48, except that of course no part program for machining the workpiece will be downloaded to the CMM. The inspection operation of the CMM will be controlled from the communications adaptor 26 rather than from the usual machine controller, in the same way as in the case of the machine tool 20. It will be appreciated that for this purpose the CMM controller (which is not shown for clarity) will have similar input and output lines 53,55 and 57 as shown in respect of the machine tool 20. The inspection data can then be sent directly back by the communications adaptor to the network manager 12 as MMS variables (e.g. for production of an inspection certificate) without any overhead of translation into MMS format. The self-teaching procedure shown in FIG. 4 can also be used on the adaptor 26 of the CMM 22.

Alternatively, the sensor 221 may be an analogue scanning probe rather than a touch trigger probe. A suitable type of probe is the OP2 laser scanning probe available from Renishaw Metrology Limited. Such a probe is particularly suited for scanning the surface of a complex workpiece under program control, taking readings of the distance of the surface of the workpiece from the probe at regular intervals, in order to produce a digital map of the contour of the surface which can be stored in a computer memory. The workpiece may for example be a model for a mould or die. The digital information may then be transferred over the network to a computer, e.g. the network manager 12, which automatically generates a part program to machine replicas of the model, and transfers that part program to a machine tool on the network. With the arrangement shown in FIG. 1, the laser probe is interfaced to analogue input ports on the communications adaptor 26 of the CMM 22, and the scanning of the workpiece by the CMM is controlled by the communications adaptor 26 in the same manner as the machine tool 20 was controlled. It will be seen that a program for capturing data from the probe can readily be written, based upon conventional algorithms as used on CMMs but running on the communications adaptor 26. The advantage is that such a program can run faster, and can produce data in the form of MMS variables which do not require translation before being passed back to the network manager. Of course, the laser probe could be similarly interfaced to the machine tool 20 if desired.

Figure 5:
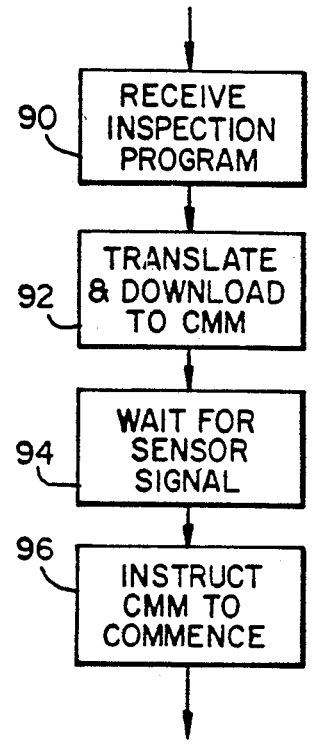

As another alternative, the sensor 221 may be a photo-diode which normally receives light from a light source such as a laser fixed on the bed of the CMM 22, the light beam being interrupted when a component to be inspected is placed on the bed. This serves as a simple detector for the presence or absence of a workpiece. The communications adaptor 26 can then be programmed as shown in FIG. 5. In step 90, it downloads the relevant inspection program from the file server 16 under the control of the network manager 12. In step 92, it translates it to the format required for the CMM 22 and downloads it to the CMM. In step 94, it waits until the sensor 221 indicates that a workpiece to be inspected has been placed on the bed of the CMM (e.g. by the robot 24), and then in step 96 it instructs the CMM 22 to commence the measurement cycle. This provides greater flexibility of network control, without the need to provide an expensive programmable logic controller to interface the sensor 221 to the network 10. Another possibility is for the communications adaptor 26 to be programmed to detect the successful removal of a workpiece after an inspection operation, as sensed by the sensor 221, and to signal the successful removal to the network manager 12. It will be appreciated that such functions may be difficult or impossible to provide via the controller of the CMM 22, since the controller may not have the necessary inputs for such a sensor 221, or because it may be inefficient to program the controller of the CMM to deal with such inputs. Also, the communications adaptor can provide signals back to the network manager 12 in MMS format, without any translation overhead.

A similar sensor for the presence or absence of a workpiece may be provided in association with the robot 24, as shown at 241 in FIG. 1. The communications adaptor 26 associated with the robot 24 can then be programmed to perform such functions as detecting that a workpiece is present for the robot to pick up, or detecting that the robot has successfully put the workpiece down. Such a sensor 241 may for example be positioned on an associated pallet, conveyor, machine tool or CMM from which the robot is picking up and putting down workpieces. Of course, the communications adaptor 26 of the robot 24 also functions in a similar manner to that described previously to pass programs, data and messages between the network 10 and the robot 24, translating them appropriately.

A similar sensor 181 for the presence or absence of material can be provided on one of the machine tools such as the machine tool 18. Here, the sensor may be arranged to sense presence or absence of a workpiece; or it may be arranged to sense when material has been removed from a particular part of the workpiece by a machining operation. This can be fed back by the communications adaptor to indicate to the network manager 12 that a particular machining operation has been satisfactorily completed.

The sensor 181 on the machine tool or sensor 221 on the CMM may be a temperature sensor. Thus, if the machine tool or CMM is only certified as being accurate when operated within a certain temperature range, e.g. 10° C. to 60° C., the communications adaptor 26 can be programmed to interrogate the temperature sensor 181,221 and to stop the operation of the machine and send an alarm message to the network manager 12 should the temperature be outside the range. This interrogation of the temperature sensor may be made at various times during the working day, for example at the start of machining or inspecting each new workpiece.

Indeed, if the machine tool or CMM has known temperature expansion characteristics, it is possible for software in the communications adaptor 26 of the machine to compensate for the inaccuracies introduced by such temperature effects. In the case of a machine tool, when the communications adaptor 26 is translating the part program for the machine (step 62, FIG. 3), it can correct all the x,y,z co-efficients contained in the program by a factor which depends on the temperature as sensed by the temperature sensor. It then sends the corrected program to the machine. As machining of successive workpieces continues, the communications adaptor periodically interrogates the sensor again to see if there has been any appreciable change of temperature, and initiates the downloading of a further corrected part program to the machine if necessary. In the case of the CMM, or if inspection data is being fed back from a machine tool to the network manager, the communications adaptor can similarly be programmed to apply a correction factor to the inspection data as it passes it in MMS format for transmission on the network, depending on the temperature sensed by the sensor 221. This can be done either with inspection data generated by the communications adaptor itself, or with data generated by the machine controller in the conventional manner, which is being translated by the adaptor.

It is also possible for the communications adaptor 26 to control other peripheral devices of the machines 18,20,22 and 24 than the sensors described so far. For example, one peripheral device which can usefully be controlled would be a conveyor 182 shown in association with the machine tool 18, for conveying workpieces to or from the machine tool. (These workpieces may be transferred between the machine tool and the conveyor by the robot 24, for example). The conveyor may be driven by servo drives so as to be driven by the right amount for receipt or delivery of the next workpiece, and this can be done via one of the I/O ports of the communications adaptor 26, under control of a program running in the adaptor. It will be appreciated that the conveyor could equally be controlled from the communications adaptor of the associated robot 24 if desired.

The various examples discussed above of devices which can be controlled from the communications adaptors need not be used alone. They can be combined in any desired combination on any given machine, provided only that the communications adaptor of that machine has appropriate I/O ports.

An advantage of controlling the various sensors and other peripheral devices from the communications adaptors 26 is that otherwise, in the absence of appropriate inputs and outputs on the controller of the machine concerned, or in the absence of adequate performance or functionality of the controller, it would be necessary to provide one or more programmable logic controllers so that these peripheral devices can be interfaced to the network 10. Since the necessary computing power is already provided in the communications adaptors for communications purposes, the present arrangements provide the necessary control of the peripheral devices without the expense of programmable logic controllers. As has been seen, they can also provide for real-time local control of these peripheral devices, without the speed penalty of passing messages to them through the network 10, without the extra load on the network 10 that this would entail, and without the overhead of translation of data to and from MMS format.

What is claimed is:

1. A factory system comprising:
    a factory machine, having control means for controlling the operation of the machine, said control means accepting or transmitting data in a first data format;
    a communications network for connecting a central computer to said factory machine and to one or more further factory machines, said communications network transmitting data in a second data format;
    a communications adaptor connected between the control means of said machine and said network, said communications adaptor comprising data processing means for translating data between said first and second data formats, the data processing means having a plurality of means for input and/or output, said control means and said network being connected to first and second said input/output means respectively;
    at least one sensing means associated with said machine, operative to produce an output relating to the state or operation of the machine, the sensing means being connected to deliver its said output to a said input/output means of the data processing means, distinct from said first and second input/output means; and
    at least one means associated with said machine for performing an operation related thereto, said means for performing an operation being connected to a said input/output means of the data processing means, distinct from the first and second input/output means, the data processing means being programmable to control said means for performing an operation in accordance with the output of the sensing means.

2. A factory system according to claim 1 wherein the sensing means is a probe for measuring a workpiece placed on the machine.

3. A factory system according to claim 2 wherein the probe is a touch trigger probe.

4. A factory system according to claim 2 wherein the probe is an analogue probe.

5. A factory system according to claim 2 wherein the factory machine is a machine tool, and the data processing means of the communications adaptor is programmed to use the probe to measure the workpiece and then to cause the machine tool to machine the workpiece in dependence on the measurement.

6. A factory system according to claim 2 wherein the data processing means of the communications adaptor is programmed to use the probe to measure the workpiece and then to transmit the results of the measurement onto the network.

7. A factory system according to claim 2 wherein a further said input/output means is connected to received an input from means for indicating the position of the probe.

8. A factory system according to claim 1 wherein said sensing means comprises means for indicating the position of one part of the machine relative to another.

9. A factory system according to claim 1 wherein the sensing means is a temperature sensor.

10. A factory system according to claim 1 wherein the sensing means comprises means for detecting the presence or absence of a workpiece or of material thereof.

11. A factory system according to claim 1 wherein the sensing means comprises means for manual input of data for controlling said machine.

12. A factory system according to claim 1, wherein said means for performing an operation comprises an input on the factory machine for controlling movement of the machine independently of data passed to the control means from the first said input/output means of the data processing means.

13. A factory system according to claim 12 wherein the sensing means comprises means for manual input of data for controlling said machine.

14. A factory system according to claim 12, wherein the sensing means is a probe on the machine for measuring a workpiece placed thereon, the data processing means being programmed to measure a workpiece by controlling machine movement via said input on the machine, and by receiving the probe output.

15. A factory system according to claim 1, wherein said means for performing an operation comprises a peripheral device associated with the machine.

16. A factory system according to claim 15, wherein the peripheral device is a conveyor.

17. A factory communications adaptor for interfacing (a) a factory machine having control means for controlling the operation of the machine, said control means accepting or transmitting data in a first data format, with (b) a communications network adapted for connecting a central computer to said factory machine and to at least one other factory machine, said communication network transmitting data in a second data format, said communications adaptor comprising:
    data processing means having a plurality of means for input and/or output, first and second said input/output means being connectable to said control means and said network respectively, the data processing means being operative to pass data between the first and second input/output means, and translating it between the first and second data formats;
    a third said input/output means connectable to a sensing means associated with said machine, said third input/output means being operative to produce an output relating to the state or operation of the machine; and
    a fourth said input/output means connectable to means associated with said machine for performing an operation related thereto said data processing means being programmable to control said means for performing an operation in accordance with the output of the sensing means.

18. A method of operating a factory system according to claim 1, in which a program is run in said data processing means to control said means for performing an operation in accordance with the output of the sensing means.

* * * * *